United States Patent
Yu

(10) Patent No.: US 10,454,909 B2
(45) Date of Patent: Oct. 22, 2019

(54) KEY NEGOTIATION METHOD AND SYSTEM, NETWORK ENTITY AND COMPUTER STORAGE MEDIUM

(71) Applicant: ZTE Corporation, Shenzhen (CN)

(72) Inventor: Wantao Yu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 120 days.

(21) Appl. No.: 15/537,118

(22) PCT Filed: Jul. 1, 2015

(86) PCT No.: PCT/CN2015/083031
§ 371 (c)(1),
(2) Date: Jun. 16, 2017

(87) PCT Pub. No.: WO2016/101579
PCT Pub. Date: Jun. 30, 2016

(65) Prior Publication Data
US 2017/0346798 A1    Nov. 30, 2017

(30) Foreign Application Priority Data

Dec. 23, 2014   (CN) .......................... 2014 1 0814755

(51) Int. Cl.
*H04L 29/06*     (2006.01)
*H04L 9/08*      (2006.01)
(Continued)

(52) U.S. Cl.
CPC .............. *H04L 63/062* (2013.01); *H04L 9/08* (2013.01); *H04L 9/3263* (2013.01); *H04L 63/06* (2013.01);
(Continued)

(58) Field of Classification Search
CPC ....... H04L 63/062; H04L 9/08; H04L 9/3263; H04L 63/06; H04L 63/065;
(Continued)

(56) References Cited

U.S. PATENT DOCUMENTS 9,775,028 B2 * 9/2017 Zhang .................. H04W 12/04
2010/0333185 A1   12/2010 Lambert
(Continued)

FOREIGN PATENT DOCUMENTS

CN          102843233 A       12/2012
CN          103096309 A        5/2013
(Continued)

OTHER PUBLICATIONS

"3rd Generation Partnership Project; Technical Specification Group Services and System Aspects; 3GPP System Architecture Evolution (SAE) ; Security architecture (Release 12)", 3GPP Standard; 3GPP TS 33.401, 3rd Generation Partnership Project (3GPP) , Mobile Competence Centre ; 650, Route Des Lucioles ; F-06921 Sophia-Antipolis Cedex ; France, vol. SA WG3, No. V12.13.0, Dec. 19, 2014 (Dec. 19, 2014), pp. 1-131, XP050927295, [retrieved on Dec. 19, 2014].

(Continued)

*Primary Examiner* — Ghodrat Jamshidi
(74) *Attorney, Agent, or Firm* — Oppedahl Patent Law Firm LLC

(57) ABSTRACT

Disclosed is a key negotiation method including that a network entity generates an MTC communication key between an MTC device or an MTC application and a network by utilizing a key distribution algorithm for MTC communication according to a root key for the MTC communication maintained by the network entity. The network entity generates an MTC group key by utilizing a key distribution algorithm for MTC group communication (Continued)

according to the root key. The network entity issues the generated MTC communication key and the generated MTC group key to the MTC device or the MTC application via a secure method so as to allow the MTC device or the MTC application to securely store the MTC communication key and the MTC group key. Also disclosed are a network entity, a key negotiation system and a computer storage medium.

10 Claims, 7 Drawing Sheets

(51) Int. Cl.
    *H04L 9/32*         (2006.01)
    *H04W 12/04*      (2009.01)
    *H04W 4/70*       (2018.01)
    *H04W 4/08*       (2009.01)
    *G06F 21/44*      (2013.01)

(52) U.S. Cl.
    CPC ........ *H04L 63/065* (2013.01); *H04L 63/0807* (2013.01); *H04W 12/04031* (2019.01); *G06F 21/44* (2013.01); *H04W 4/08* (2013.01); *H04W 4/70* (2018.02)

(58) Field of Classification Search
    CPC .. H04L 63/0807; H04W 12/04; H04W 12/70; H04W 4/08; H04W 12/04031; G06F 21/44
    See application file for complete search history.

(56) References Cited

U.S. PATENT DOCUMENTS

| | | | |
|---|---|---|---|
| 2011/0261962 A1 | 10/2011 | Dupuis et al. | |
| 2012/0157050 A1* | 6/2012 | Kang | H04W 12/06 455/411 |
| 2013/0080782 A1 | 3/2013 | Rajadurai | |
| 2013/0086668 A1* | 4/2013 | Prasad | H04L 9/0833 726/7 |
| 2013/0128777 A1* | 5/2013 | Garcia Azorero | H04W 4/70 370/259 |
| 2013/0155948 A1* | 6/2013 | Pinheiro | H04W 4/08 370/328 |
| 2013/0304857 A1* | 11/2013 | Li | H04W 8/186 709/217 |
| 2013/0315389 A1 | 11/2013 | Jung | |
| 2014/0075509 A1* | 3/2014 | Holtmanns | H04L 63/0869 726/3 |
| 2014/0233736 A1 | 8/2014 | Zhang et al. | |
| 2014/0237559 A1* | 8/2014 | Zhang | H04W 12/04 726/4 |
| 2014/0244994 A1* | 8/2014 | Yu | H04W 12/04 713/2 |
| 2015/0009813 A1* | 1/2015 | Nguyen | H04W 74/002 370/230 |
| 2015/0230063 A1* | 8/2015 | Chandramouli | H04W 4/70 455/466 |
| 2015/0334560 A1* | 11/2015 | Zhang | H04W 12/04 380/284 |
| 2017/0127277 A1* | 5/2017 | Yu | H04W 4/70 |

FOREIGN PATENT DOCUMENTS

| | | |
|---|---|---|
| EP | 2765793 A1 | 8/2014 |
| WO | 2011152665 A2 | 12/2011 |

OTHER PUBLICATIONS

"3rd Generation Partnership Project; Technical Specification Group Services and System Aspects; Study on security aspects of Machine-Type Communications (MTC) and other mobile data applications communications enhancements (Release 12)", 3GPP Standard; 3GPP TR 33.868, 3rd Generation Partnership Project (3GPP), Mobile Competenct Centre ; 650, Route Des Lucioles ; F-06921 Sophia-Antipolis Cedex ; =France, vol . SA WG3, No. V12.1.0, Jun. 26, 2014 (Jun. 26, 2014), pp. 1-116, XP050774355, [retreived on Jun. 26, 2014] pp. 73, line 9-p.74, line 1 Figure 5.7.4. 1.2-1.

Supplementary European Search Report in European application number: 15871654.8, dated Oct. 20, 2017.

International Search Report in international application number:PCT/CN2015/083031 dated Oct. 9, 2015.

English Translation of the Written Opinion of the International Search Authority in international application number: PCT/CN2015/083031, dated Oct. 9, 2015.

European Office Action dated Jun. 4, 2019; European Patent Application No. 15871654.8 filed Jul. 1, 2015.

\* cited by examiner

KEY NEGOTIATION METHOD AND SYSTEM, NETWORK ENTITY AND COMPUTER STORAGE MEDIUM

TECHNICAL FIELD

The disclosure relates to Machine Type Communication (MTC) technology and in particular to a key negotiation method, a system, a network entity and a computer storage medium.

BACKGROUND

Communication between devices as well as between a device and a data centre will dominate in the future communication network. Cheaper storage technology makes it possible for people and devices to obtain massive amounts of information. With the development of the processing power of a chip and real-time online technology, the device will be a major participant in the future mobile communication. Machine to machine communication is a general term of techniques and combination thereof for realizing data communication and exchange between machines, as well as between machines and people by applying the communication technology.

The MTC technology integrates the communication technology and the information technology and can be applied to the bidirectional communication such as remotely collecting information, setting up parameters and sending instructions. Thus, different application schemes can be implemented, for example, safety monitoring, automatic selling, goods tracking and so on. Accordingly, almost all devices involved in the daily life are likely to be potential service objects.

In the MTC system, entities participated in communication include a large number of MTC devices and MTC applications. In order to reduce network load and save network resource, it needs to optimize the management of the MTC devices and MTC applications in groups. As such, the MTC device and MTC applications can be controlled, managed, billed and so on in groups, so as to adapt to requirements of the operators. After grouping the MTC devices and MTC applications, it is needed to secure the communication between the devices in a group and the network, as well as between the network and the groups. Specifically, on the one hand, it needs to secure the communication based on groups because the communication based on the MTC group can reduce the network resource load. On the other hand, a single MTC device or MTC application in an MTC group may need to communicate with the network separately, which requires to secure the communication of the single MTC device or MTC application.

At present, separate and different security solutions are provided for communication based on the MTC group and communication of a single MTC device or single MTC application in the MTC group. For MTC devices/MTC applications in one MTC group, in order to secure the communication based on the MTC group and communication based on a single MTC device/MTC application, the MTC device/MTC application is required to simultaneously have a security key of communication based on the MTC group and a security key of communication based on an MTC device/MTC application. However, such two security keys for different purposes are obtained in different security processes, resulting in increase in the signalling load of the MTC communication system. Therefore, for the scenario of communication based on the MTC group, how to simultaneously obtain two types of session keys in one key negotiation process is a technical problem urgent to be solved.

SUMMARY

In order to solve the existing technical problem, the disclosure is to provide a key negotiation method, a system, a network entity and a computer storage medium.

Embodiments of the disclosure provide a key negotiation method applied to a network entity. A Machine Type Communication (MTC) communication key between an MTC device or MTC application and a network is generated by utilizing a key distribution algorithm for MTC communication according to a root key for the MTC communication maintained by the network entity. An MTC group key is generated by utilizing a key distribution algorithm for MTC group communication according to the root key. The generated MTC communication key and the generated MTC group key are issued to the MTC device or MTC application via a secure method so as to allow the MTC device or MTC application to securely store the MTC communication key and the MTC group key.

In an exemplary embodiment, before generating the MTC communication key and the MTC group key, the method further includes: an MTC group is created and a corresponding MTC group identification is generated; MTC group register request information sent by the MTC device or MTC application is received; and the MTC device or MTC application are validated or certificated, and after passing the validation or certification, a relationship table of the MTC group identification and identity information of the MTC device or MTC application is updated and stored according to related information in the received MTC group register request information.

In an exemplary embodiment, before issuing the generated MTC communication key and the MTC group key to the MTC device or MTC application via a secure method, the method further includes: an MTC group notification is issued to the MTC device or MTC application; and acknowledgement information returned by the MTC device or MTC application is received.

In an exemplary embodiment, after issuing the MTC communication key and the MTC group key, the method further includes: acknowledgement information returned by the MTC device or MTC application is received.

In an exemplary embodiment, generating the MTC communication key between the MTC device or MTC application and the network by utilizing the key distribution algorithm for the MTC communication according to the root key for the MTC communication maintained by the network entity includes: the root key, the identity information of the MTC device or MTC application and one random number are taken as distribution parameters, and the distribution parameters are put into the key distribution algorithm for the MTC communication to generate the MTC communication key.

In an exemplary embodiment, generating the MTC group key by utilizing the key distribution algorithm for the MTC group communication according to the root key includes: the root key and one random number are taken as distribution parameters, and the distribution parameters are put into the key distribution algorithm for the MTC group communication to generate the MTC group key.

In an exemplary embodiment, the method further includes: MTC communication keys and/or MTC group keys corresponding to all MTC devices or MTC applications in an MTC group of the network entity are updated according to a set security policy.

In an exemplary embodiment, updating the MTC communication keys and/or MTC group keys corresponding to all the MTC devices or MTC applications in the MTC group of the network entity includes: a key update notification is issued to all the MTC devices or MTC applications; acknowledgement formation returned by the MTC devices or MTC applications is received; and the MTC group identification and a new MTC communication key and/or MTC group key corresponding to the MTC group identification are issued to a corresponding MTC device or MTC application via a secure method so as to allow the corresponding MTC device or MTC application to update and securely store the new MTC communication key and/or MTC group key corresponding to the MTC group identification.

The disclosure further provides a key negotiation method. A network entity generates a Machine Type Communication (MTC) communication key between an MTC device or MTC application and a network by utilizing a key distribution algorithm for MTC communication according to a root key for the MTC communication maintained by the network entity and generates an MTC group key by utilizing a key distribution algorithm for MTC group communication according to the root key. The network entity issues the generated MTC communication key and the generated MTC group key to the MTC device or MTC application via a secure method. The MTC device or MTC application securely stores the MTC communication key and the MTC group key.

In an exemplary embodiment, before generating the MTC communication key and the MTC group key, the network entity creates an MTC group, and generates a corresponding MTC group identification. The MTC device or MTC application sends MTC group register request information to the network entity. The network entity validates or certificates the MTC device or MTC application and after passing the validation or certification, updates and stores a relationship table of the MTC group identification and identity information of the MTC device or MTC application according to related information in the received MTC group register request information.

In an exemplary embodiment, before issuing the generated MTC communication key and the MTC group key to the MTC device or MTC application via a secure method, the network entity issues an MTC group notification to the MTC device or MTC application. The MTC device or MTC application performs authentication on the received MTC group notification, and returns acknowledgement information to the network entity after passing the authentication.

In an exemplary embodiment, the MTC device or MTC application further stores the MTC group identification. After storing the MTC communication key, the MTC group key and the MTC group identification by the MTC device or MTC application, the MTC device or MTC application returns acknowledgement information to the network entity.

In an exemplary embodiment, generating the MTC communication key between the MTC device or MTC application and the network by utilizing the key distribution algorithm for the MTC communication according to the root key for the MTC communication maintained by the network entity includes the network entity takes the root key, the identity information of the MTC device or MTC application and one random number as distribution parameters, and puts the distribution parameters into the key distribution algorithm for the MTC communication to generate the MTC communication key.

In an exemplary embodiment, generating the MTC group key by utilizing the key distribution algorithm for the MTC group communication according to the root key includes the network entity takes the root key and one random number as distribution parameters, and puts the distribution parameters into the key distribution algorithm for the MTC group communication to generate the MTC group key.

In an exemplary embodiment, the network entity updates MTC communication keys and/or MTC group keys corresponding to all MTC devices or MTC applications in an MTC group of the network entity according to a set security policy.

In an exemplary embodiment, updating the MTC communication keys and/or MTC group keys corresponding to all the MTC devices or MTC applications in the MTC group of the network entity includes the network entity issues a key update notification to the MTC device or MTC application. The MTC device or MTC application performs authentication on the received key update notification of the MTC group, and returns acknowledgement information to the network entity after passing the authentication. The network entity issues the MTC group identification and a new MTC communication key and/or MTC group key corresponding to the MTC group identification to the MTC device or MTC application via a secure method. The MTC device or MTC application updates with and securely stores the new MTC communication key and/or MTC group key corresponding to the MTC group identification after receiving the MTC group identification and the new MTC communication key and/or MTC group key.

The disclosure further provides a network entity including a first key generating unit, a second key generating unit and a transmission unit. The first key generating unit is configured to generate a Machine Type Communication (MTC) communication key between an MTC device or MTC application and a network by utilizing a key distribution algorithm for MTC communication according to a maintained root key for the MTC communication. The second key generating unit is configured to generate an MTC group key by utilizing a key distribution algorithm for MTC group communication according to the root key. The transmission unit is configured to issue the generated MTC communication key and the generated MTC group key to the MTC device or MTC application via a secure method so as to allow the MTC device or MTC application to securely store the MTC communication key and the MTC group key.

In an exemplary embodiment, the network entity further includes an MTC group creating unit and a receiving unit. The MTC group creating unit is configured to create an MTC group, generate a corresponding MTC group identification, validate or certificate the MTC device or MTC application, after passing the validation and or certification, update and store a relationship table of the MTC group identification and identity information of the MTC device or MTC application according to related information in a received MTC group register request information, and trigger the first key generating unit and the second key generating unit. The receiving unit is configured to receive MTC group register request information sent by the MTC device or MTC application. The first key generating unit is configured to generate the MTC communication key between the MTC device or MTC application and the network by utilizing the key distribution algorithm for the MTC communication according to the root key in response to trigger from the MTC group creating unit. The second key generating unit is configured to generate the MTC group key by utilizing the key distribution algorithm for the MTC group communication according to the root key in response to trigger from the MTC group creating unit.

In an exemplary embodiment, the transmission unit is further configured to issue an MTC group notification to the MTC device or MTC application, and issue the generated MTC communication key and the generated MTC group key to the MTC device or MTC application via a secure method in response to trigger from the receiving unit. The receiving unit is further configured to trigger the transmission unit after receiving acknowledge information returned by the MTC device or MTC application.

In an exemplary embodiment, the receiving unit is further configured to receive the acknowledgement information returned by the MTC device or MTC application after securely storing the MTC communication key and the MTC group key by the MTC device or MTC application.

In an exemplary embodiment, the transmission unit is further configured to issue a key update notification to all MTC devices or MTC applications, and issue the MTC group identification and a new MTC communication key and/or MTC group key corresponding to the MTC group identification to a corresponding MTC device or MTC application via a secure method so as to allow the corresponding MTC device or MTC application to update with and securely store the new MTC communication key and/or MTC group key corresponding to the MTC group identification.

The disclosure further provides a key negotiation system including a network entity and a Machine Type Communication (MTC) device. The network entity is configured to generate an MTC communication key between an MTC device or MTC application and a network by utilizing a key distribution algorithm for MTC communication according to a maintained root key for the MTC communication, generate an MTC group key by utilizing a key distribution algorithm for MTC group communication according to the root key, and issue the generated MTC communication key and the generated MTC group key to the MTC device via a secure method. The MTC device is configured to securely store the MTC communication key and the MTC group key after receiving the MTC communication key and the MTC group key.

In an exemplary embodiment, the network entity is further configured to create an MTC group and generate a corresponding MTC group identification before generating the MTC communication key and the MTC group key, validate or certificate the MTC device after receiving an MTC group register request information, and after passing the validation or certification, update and store a relationship table of the MTC group identification and identity information of the MTC device or MTC application according to related information in the receive MTC group register request information. The MTC device is configured to send the MTC group register request information to the network entity.

In an exemplary embodiment, the network entity is further configured to issue an MTC group notification to the MTC device before issuing the generated MTC communication key and the generated MTC group key to the MTC device and receive acknowledgement information returned by the MTC device. The MTC device is further configured to perform authentication on the received MTC group notification, and return acknowledgement information to the network entity after passing the authentication.

In an exemplary embodiment, the MTC device is further configured to store the MTC group identification, and return acknowledgement information to the network entity after storing the MTC communication key, the MTC group key and the MTC group identification. The network entity is further configured to receive acknowledgement information returned by the MTC device.

In an exemplary embodiment, the network entity is further configured to update MTC communication keys and/or MTC group keys corresponding to all MTC devices or MTC applications in an MTC group of the network entity according to a set security policy.

In an exemplary embodiment, the network entity is configured to issue a key update notification to the MTC device, and issue the MTC group identification and a new MTC communication key and/or MTC group key corresponding to the MTC group identification to the MTC device via a secure method after receiving acknowledgement information returned by the MTC device. The MTC device is configured to perform authentication on the received key update notification of the MTC group after receiving the key update notification issued by the network entity, return acknowledgement information to the network entity after passing the authentication, and update with and securely store the new MTC communication key and/or MTC group key corresponding to the MTC group identification after receiving the MTC group identification and the new MTC communication key and/or MTC group key.

The disclosure further provides a computer storage medium including a set of instructions, which, when being executed, cause at least one processor to execute the key negotiation method applied to a network entity.

The disclosure provides a key negotiation method, a system, a network entity and a computer storage medium. The network entity generates a Machine Type Communication (MTC) communication key between an MTC device or MTC application and a network by utilizing a key distribution algorithm for MTC communication according to a root key for the MTC communication maintained by the network entity and generates an MTC group key by utilizing a key distribution algorithm for MTC group communication according to the root key. The network entity issues the generated MTC communication key and the generated MTC group key to the MTC device or MTC application via a secure method so as to allow the MTC device or MTC application to securely store the MTC communication key and the MTC group key. Therefore, two types of session keys are simultaneously obtained during one key negotiation process, thereby effectively reducing signalling load in the MTC communication system.

BRIEF DESCRIPTION OF THE DRAWINGS

In accompanying drawings (not necessarily drawn in proportion), like reference numerals denote like parts in different views. The like reference numerals having different letter suffixes may represent different examples of the like parts. The accompanying drawings substantially show each embodiment discussed herein in an exemplary but not limited way.

DETAILED DESCRIPTION

The implementation of the technical solution will be further elaborated below in conjunction with the accompanying drawings.

In each embodiment of the disclosure, a network entity generates an MTC communication key between an MTC device or an MTC application and the network by utilizing a key distribution algorithm for MTC communication according to a root key for the MTC communication maintained by the network entity, and generates an MTC group key by utilizing a key distribution algorithm for MTC group communication according to the root key. The network entity issues the generated MTC communication key and the MTC group key to the MTC device or MTC application via a secure method. The MTC device or MTC application securely stores the MTC communication key and the MTC group key.

Embodiment One

Figure 1:
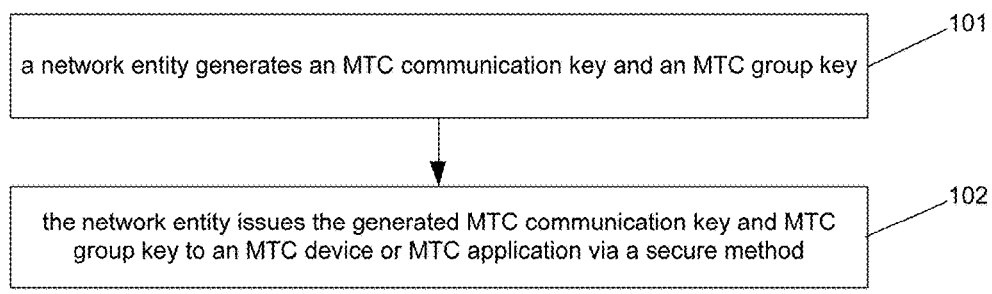
FIG. 1 is a flowchart showing a key negotiation method according to Embodiment One of the disclosure.

The Embodiment One provides a key negotiation method. As shown in FIG. 1, the method includes the following steps.

At step 101, the network entity generates an MTC communication key between an MTC device or an MTC application and the network by utilizing a key distribution algorithm for MTC communication according to a root key for the MTC communication maintained by the network entity. The network entity generates an MTC group key by utilizing a key distribution algorithm for MTC group communication according to the root key.

Herein, the network entity may be any communication entity for managing the MTC group in the core network, for example, Mobility Management Entity (MME), Serving GPRS Support Node (SGSN), Home Subscriber Server (HSS), MTC-Inter Working Function (MTC-IWF), or an MTC service management platform and so on.

Before executing the step 101, the network entity creates an MTC group, and generates a corresponding MTC group identification. Accordingly, the MTC device or MTC application may be added into the created MTC group to complete the key negotiation process.

Thus, before executing the step 101, the network entity receives MTC group register request information sent by the MTC device or MTC application. The network entity further validates or certificates the MTC device or MTC application, and then updates and stores a relationship table of the MTC group identification and identity information of the MTC device or MTC application according to related information in the received MTC group register request information.

Herein, the MTC group register request information may include identity information of the MTC device or MTC application, information of the MTC group identification and so on.

The MTC communication key is used for securing the communication based on a single MTC device/MTC application. The MTC group key is used for securing a communication based on an MTC group.

The step of generating an MTC communication key includes the network entity takes the root key, identity information of the MTC device or MTC application and one random number as distribution parameters, and puts the distribution parameters into a key distribution algorithm for the MTC communication to generates the MTC communication key.

Herein, the identity information of the MTC device may be an International Mobile Equipment Identity (IMEI) or an International Mobile Subscriber Identity (IMSI) and so on.

The step of generating an MTC group specifically includes the network entity takes the root key and one random number as distribution parameters, and puts the distribution parameters into a key distribution algorithm for the MTC group communication to generate the MTC group key.

At step 102, the network entity issues the generated MTC communication key and the MTC group key to the MTC device or MTC application via a security method, so as to allow the MTC device or MTC application to securely store the MTC communication key and the MTC group key.

Herein, before executing the step 102, the network entity issues a group notification to the MTC device or MTC application, and receives acknowledgement information returned by the MTC device or MTC application.

After the step 102, the method may further include the network entity receives an acknowledgement message returned by the MTC device or MTC application.

After the step 102, the network entity updates the MTC communication keys and/or MTC group keys corresponding to all the MTC devices or MTC applications in an MTC group of the network entity according to a set security policy.

Specifically, the network entity issues a key update notification to all the MTC devices or MTC applications, receives acknowledgement information returned by the MTC devices or MTC applications. The network entity issues an MTC group identification and a new MTC communication key and/or MTC group key corresponding to the MTC group identification to the corresponding MTC device or MTC application, so as to allow the corresponding MTC device or MTC application to update with and securely store the new MTC communication key and/or MTC group key corresponding to the MTC group identification.

Herein, information of the notification may include information of the MTC group identification.

The security policy can be set as required.

Figure 2:
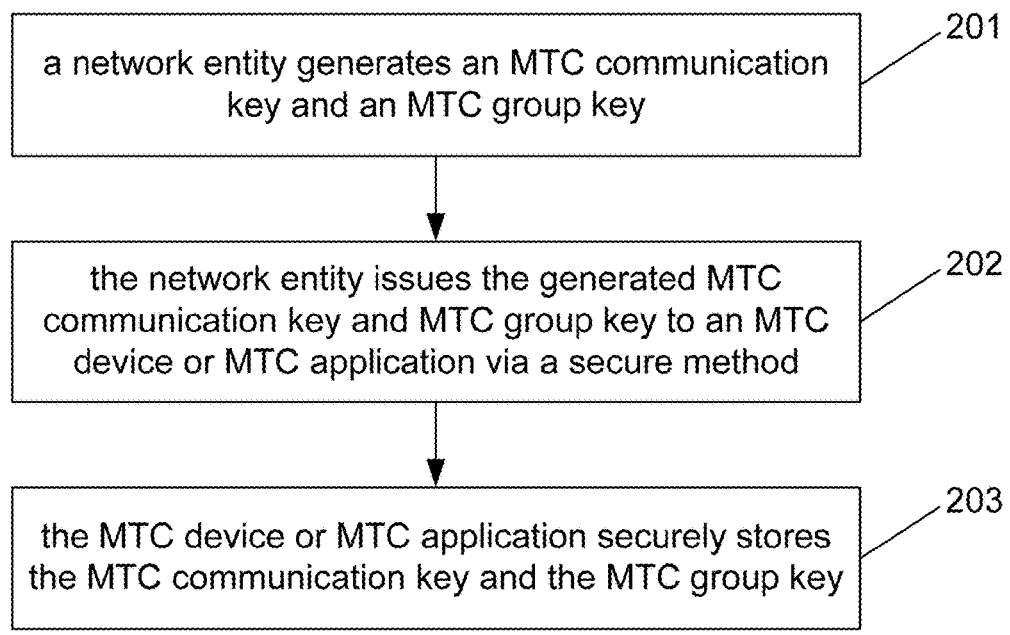
FIG. 2 is a flowchart showing another key negotiation method according to Embodiment One of the disclosure.

The Embodiment One further provides another key negotiation method. As shown in FIG. 2, the method may include the following steps.

At step 201, the network entity generates an MTC communication key between an MTC device or MTC application and a network by utilizing a key distribution algorithm for MTC communication according to a root key for the MTC communication maintained by the network entity. The network entity generates an MTC group key by utilizing a key distribution algorithm for MTC group communication according to the root key.

Herein, the network entity may be any communication entity for managing the MTC group in the core network, such as MME, SGSN, HSS, MTC-IWF or an MTC service management platform and so on.

Before executing the step 201, the network entity creates an MTC group and generates a corresponding MTC group identification. Accordingly, the MTC device or MTC application may be added into the created MTC group to complete the key negotiation process.

Thus, before executing the step 201, the MTC device or MTC application sends MTC group register request information to the network entity. The network entity further validates or certificates the MTC device or MTC application, and then updates and stores a relationship table of the MTC group identification and identity information of the MTC device or MTC application according to related information in the received MTC group register request information.

Herein, the MTC group register request information may include identity information of the MTC device or MTC application, information of the MTC group identification and so on.

The MTC communication key is used for securing the communication based on a single MTC device/MTC application. The MTC group key is used for securing the communication based on the MTC group.

The step of generating an MTC communication key specifically includes the network entity takes the root key, the identity information of the MTC device or MTC application and one random number as distribution parameters, and puts the distribution parameters into a key distribution algorithm for the MTC communication to generate the MTC communication key.

Herein, the identity information of the MTC device may be IMEI, or IMSI and so on.

The step of generating an MTC group key specifically includes the network entity takes the root key and one random number as distribution parameters, and puts the distribution parameters into a key distribution algorithm for the MTC group communication to generate the MTC group key.

At step 202, the network entity issues the generated MTC communication key and the MTC group key to the MTC device or MTC application via a secure method.

Herein, before executing the step 202, the network entity issues an MTC group notification to the MTC device or MTC application. The MTC device or MTC application performs authentication on the received MTC group notification, and returns acknowledgement information to the network entity after passing the authentication.

At step 203, the MTC device or MTC application securely stores the MTC communication key and the MTC group key.

Herein, the MTC device or MTC application also stores the MTC group identification while securely storing the MTC communication key and the MTC group key.

After the MTC device stores the MTC communication key, the MTC group key and the MTC group identification, the method may further include the MTC device or MTC application returns acknowledgement information to the network entity.

After the step 203, the network entity updates the MTC communication keys and/or MTC group keys corresponding to all the MTC devices or MTC applications in an MTC group of the network entity according to a set security policy.

Specifically, the network entity issues a key update notification to the MTC device or MTC application. The MTC device or MTC application performs authentication on the received key update notification of the MTC group, and returns acknowledgement information to the network entity after passing the authentication. The network entity issues the MTC group identification and a new MTC communication key and/or MTC group key corresponding to the MTC group identification to the MTC device or MTC application via a secure method. The MTC device or MTC application updates with and securely stores the new MTC communication key and/or MTC group key corresponding to the MTC group identification after receiving the MTC group identification and the new MTC communication key and/or the new MTC group key.

Herein, the information of the notification may include information of the MTC group identification.

The security policy may be set as required.

The MTC device or MTC application returns acknowledgement information to the network entity after storing the new MTC communication key and/or MTC group key.

It can be seen from the above description that the key negotiation method provided by the Embodiment One of the disclosure is a key negotiation method for MTC group communication. The network entity generates an MTC communication key between an MTC device or MTC application and the network by utilizing a key distribution algorithm for MTC communication according to a root key for the MTC communication maintained by the network entity; and generates an MTC group key by utilizing a key distribution algorithm for MTC group communication according to the root key. The network entity issues the MTC communication key and the MTC group key to the MTC device or MTC application via a secure method. The MTC device or MTC application securely stores the MTC communication key and the MTC group key. Thus, two types of session keys are obtained simultaneously through one key negotiation process. Accordingly, the signaling load of the MTC communication system is effectively reduced.

In addition, the network entity manages and maintains a root key for the MTC communication. Meanwhile, the network entity further deploys a key distribution algorithm for the MTC communication and a key distribution algorithm for the MTC group communication. Herein, the key distribution algorithm for the MTC communication is used for generating an MTC communication key between the MTC device and the network, and the key distribution algorithm for the MTC group communication is used for generating an MTC group key. Since the root key acts as a seed root of the key distribution algorithms for the MTC communication key and the MTC group key, the network entity only needs to maintain and manage the root key, the key distribution algorithm for the MTC communication and the key distribution algorithm for the MTC group communication, without maintaining and managing all communication keys and group keys, thereby effectively reducing resource consumption of the network entity.

Embodiment Two

Embodiment Two elaborates a key negotiation process of the MTC group communication based on the method provided by the Embodiment One.

Figure 3:
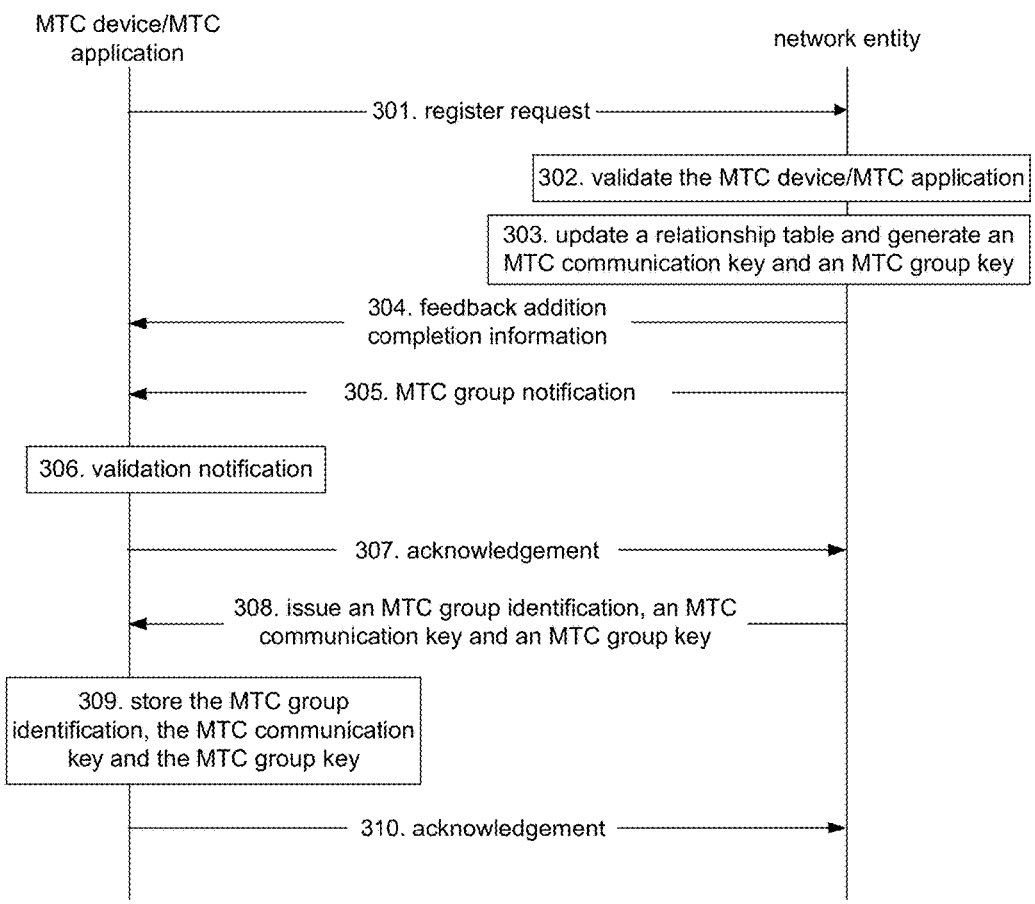
FIG. 3 is a flowchart showing a key negotiation method for an MTC group communication according to Embodiment Two of the disclosure.

The Embodiment Two is for a key negotiation method of an MTC group communication. As shown in FIG. 3, the method includes the following steps.

At step 301, an MTC device or MTC application sends MTC group register request information to a network entity.

Herein, the MTC group register request information may include identity information of the MTC device or MTC application and information of the MTC group identification.

The network entity may be any communication entity for managing the MTC group in the core network, such as MME, SGSN, HSS, MTC-IWF or an MTC service management platform and so on.

At step 302, the network entity validates or certificates the MTC device or MTC application after receiving the MTC group register request information.

Herein, the step that the network entity validates or certificates the MTC device or MTC application is implemented and completed by the network entity, an MTC user or an operator and so on.

The specific validation or certification process is not limited in this embodiment.

At step 303, after validating or certificating, the network entity updates and stores a relationship table of the MTC group identification and identity information of the MTC device or MTC application according to the identity information of MTC device or MTC application in the register request information. Meanwhile, the network entity generates an MTC group key and an MTC communication key.

Figure 4:
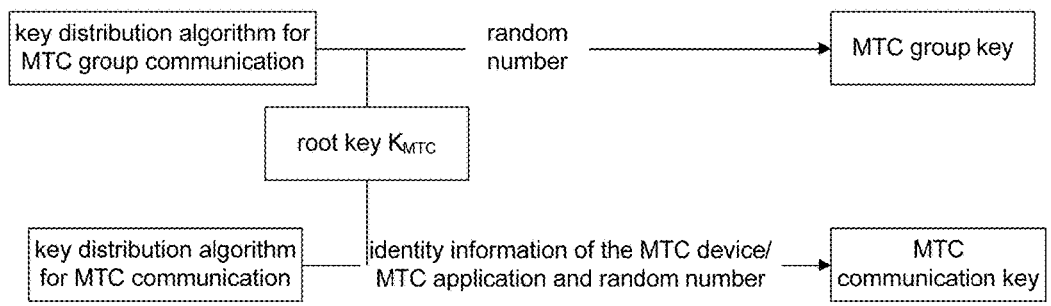
FIG. 4 is a schematic structure illustrating key management for an MTC group communication according to Embodiment Two of the disclosure.

Herein, as shown in FIG. 4, the network entity takes a root key $K_{MTC}$ and one random number as distribution parameters, and puts the distribution parameters into a key distribution algorithm for the MTC group communication to generate an MTC group key.

The network entity takes the received identity information of the MTC device or MTC application, the root key $K_{MTC}$ and one random number as distribution parameters, and puts the distribution parameters into a key distribution algorithm for the MTC group communication to generate an MTC communication key.

At step 304, the network entity returns addition completion information to the MTC device or MTC application.

At step 305, the network entity issues an MTC group notification message to the MTC device or MTC application.

At step 306, the MTC device or MTC application performs authentication on the received MTC group notification message to validate the notification.

Herein, the specific process of authentication is not limited in the embodiment.

At step 307, the MTC device or MTC application returns acknowledgement information to the network entity after passing the authentication.

At step 308, after receiving the acknowledgement information, the network entity issues the generated MTC communication key, the MTC group identification and the MTC group key corresponding to the MTC group identification to the MTC device or MTC application via a secure method.

Herein, the specific implementation process of the secure method is not limited in the embodiment.

At step 309, after receiving the MTC communication key, the MTC group identification and the MTC group key corresponding to the MTC group identification, the MTC device or MTC application securely stores the MTC communication key, the MTC group identification and the MTC group key, and then step 310 is executed.

Herein, the embodiment does not limit the specific implementation process of securely storing the MTC communication key, the MTC group identification and the MTC group key.

At step 310, the MTC device or MTC application returns acknowledge information to the network entity.

It can be seen from the above description that in the embodiment, since the network entity and each member in the MTC group have respective MTC communication keys, MTC group identification and MTC group keys uniquely corresponding to the MTC group, it is possible to ensure secure communication between the MTC device or MTC application and the network entity, as well as between the network entity and the MTC group. The method is an achievable key negotiation method for the MTC communication.

Embodiment Three

Figure 5:
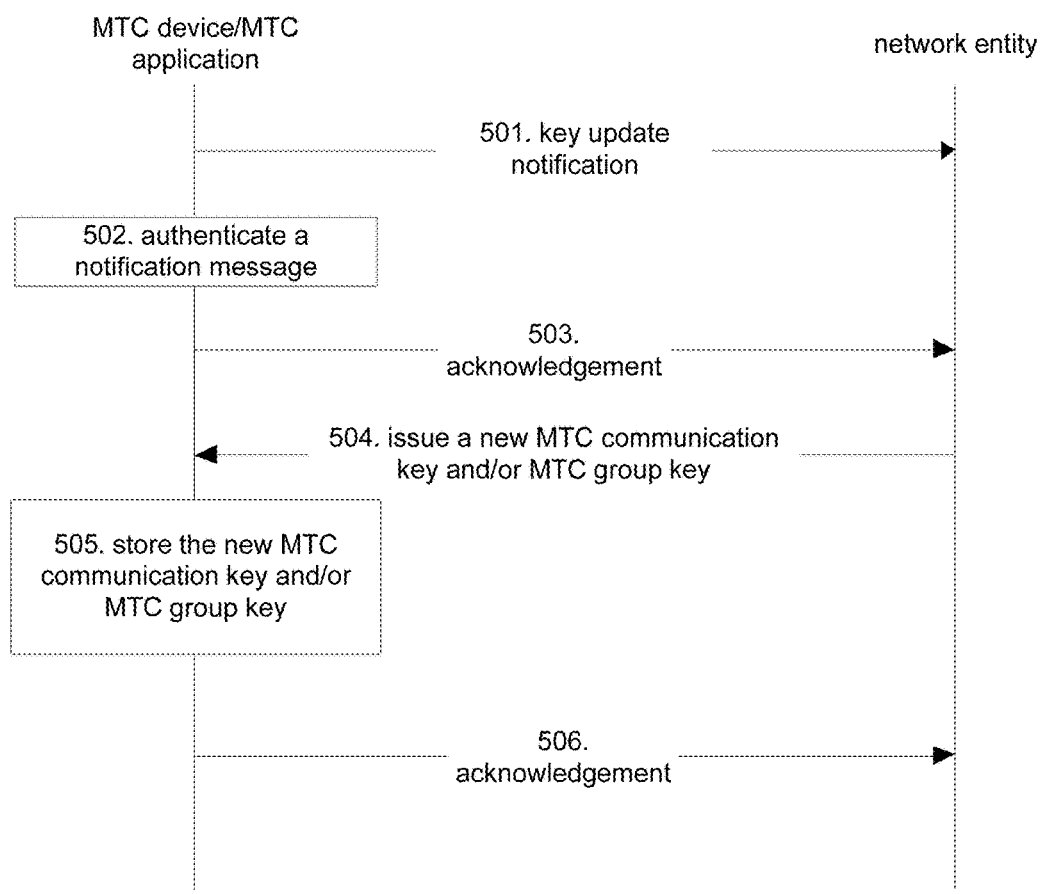
FIG. 5 is a flowchart showing a key update method for an MTC group communication according to Embodiment Three of the disclosure.

On the basis of the method of the Embodiment One, Embodiment Three describes a key update process of the MTC group communication based on the Embodiment Two. The Embodiment Three provides a key update method for an MTC group communication. As shown in FIG. 5, the method includes the following steps.

At step 501, a network entity issues a key update notification to an MTC device or MTC application.

Herein, the notification may include information of the MTC group identification.

At step 502, the MTC device or MTC application performs authentication on the received message of the key update notification of the MTC group key to validate the notification.

At step 503, after passing the authentication, the MTC device or MTC application returns acknowledgement information to the network entity.

At step 504, the network entity issues the MTC group identification and a new MTC communication key and/or MTC group key corresponding to the MTC group identification to the MTC device or MTC application via a secure method.

At step 505, after receiving the MTC group identification and the new MTC communication key and/or MTC group key, the MTC device or MTC application updates with the new MTC communication key and/or MTC group key corresponding to the MTC group identification and securely stores the same, and then step 506 is executed.

At step 506, the MTC device or MTC application returns acknowledgement information to the network entity.

It should be noted that when the network entity updates the MTC communication key and MTC group key according to a certain security policy, it is required to update MTC communication keys and MTC group keys corresponding to all the MTC devices or MTC applications in the MTC group.

Embodiment Four

Figure 6:
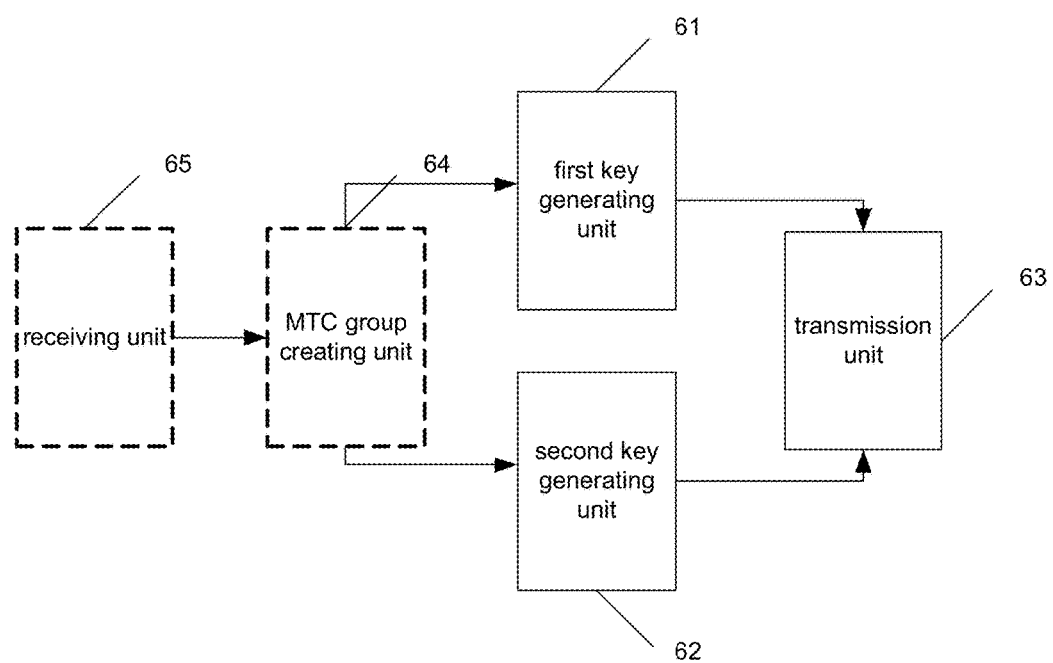
FIG. 6 is a schematic structure illustrating a network entity according to Embodiment Four of the disclosure.

In order to implement the method as shown in FIG. 1, Embodiment Four provides a network entity. As shown in FIG. 6, the network entity may include a first key generating unit 61, a second key generating unit 62 and a transmission unit 63. Herein, the first key generating unit 61 is configured to generate an MTC communication key between an MTC device or MTC application and a network by utilizing a key distribution algorithm for MTC communication according to a maintained root key for the MTC communication. The second key generating unit 62 is configured to generate an MTC group key by utilizing a key distribution algorithm for MTC group communication according to the root key. The transmission unit 63 is configured to issue the generated MTC communication key and the MTC group key to the MTC device or MTC application via a secure method, so as to allow the MTC device or MTC application to securely store the MTC communication key and the MTC group key.

Herein, the network entity may be any communication entity for managing the MTC group in the core network, such as MME, SGSN, HHS, MTC-IWF, or an MTC service management platform and so on.

The network entity may further include an MTC group creating unit 64 configured to create an MTC group and generate a corresponding MTC group identification. Accordingly, the MTC device or MTC application may be added into the process of creating the MTC group to complete the key negotiation process.

Thus, the network entity may further include a receiving unit 65 configured to receive MTC group register request information sent by the MTC device or MTC application.

The MTC group creating unit 64 may be further configured to validate and certificate the MTC device or MTC application. After passing the validation or certification, the MTC group creating unit 64 update and store a relationship table of an MTC group identification and identity information of the MTC device or MTC application according to related information in the received MTC group register request information and trigger the first key generating unit 61 and the second key generating unit 62.

Accordingly, the first key generating unit 61 is configured to generate an MTC communication key between the MTC device or MTC application and the network by utilizing a key distribution algorithm for the MTC communication according to the root key in response to trigger from the MTC group creating unit.

The second key generating unit 62 is configured to generate an MTC group key by utilizing a key distribution algorithm for the MTC group communication according to the root key in response to trigger from the MTC group creating unit.

Herein, the MTC group register request information may include identity information of the MTC device or MTC application, information of the MTC group identification and so on.

The MTC communication key is used for securing a communication based on a single MTC device or MTC application. The MTC group key is used for securing a communication based on the MTC group.

Specifically, the first key generating unit 61 is configured to take the root key, the identity information of the MTC device or MTC application and one random number as distribution parameters, and put the distribution parameters into the key distribution algorithm for the MTC communication to generate the MTC communication key.

Herein, the identity information of the MTC device may be IMEI or IMSI and so on.

Specifically, the second key generating unit 62 is configured to take the root key and one random number as distribution parameters, and put the distribution parameters into the key distribution algorithm for the MTC group communication to generate the MTC group key.

The transmission unit 63 is further configured to issue an MTC group notification to the MTC device or MTC application, and issue the generated MTC communication key and MTC group key to the MTC device or MTC application via a secure method in response to trigger from the receiving unit 65.

The receiving unit 65 is further configured to trigger the transmission unit 63 after receiving acknowledgement information returned by the MTC device or MTC application.

The receiving unit 65 is further configured to receive the acknowledgement information returned by the MTC device or MTC application after securely storing the MTC communication key and the MTC group key by the MTC device or MTC application.

The network entity updates MTC communication keys and/or MTC group keys corresponding to all MTC devices or MTC applications in the MTC group of the network entity according to a set security policy.

Specifically, the transmission unit 63 is further configured to issue a key update notification to all the MTC devices or MTC applications, and issue the MTC group identification and a new MTC communication key and/or MTC group key corresponding to the MTC group identification to a corresponding MTC device or MTC application via a secure method, so as to allow the corresponding MTC device or MTC application to update with and securely store the new MTC communication key and/or MTC group key corresponding to the MTC group identification.

The receiving unit 65 is further configured to receive acknowledgement information for the key update returned by the MTC device or MTC application.

Herein, the notification information may include MTC group identification information.

The security policy may be set as required.

In practical application, the first key generating unit 61, the second key generating unit 62 and the MTC group creating unit 64 may be implemented by a Central Processing Unit (CPU), a Micro Control Unit (MCU), a Digital Signal Processor (DSP) or a Field Programmable Gate Array (FPGA) in the network entity. The transmission unit 63 may be implemented by a transmitter in the network entity, and the receiving unit 65 may be implemented by a receiver in the network entity.

Figure 7:
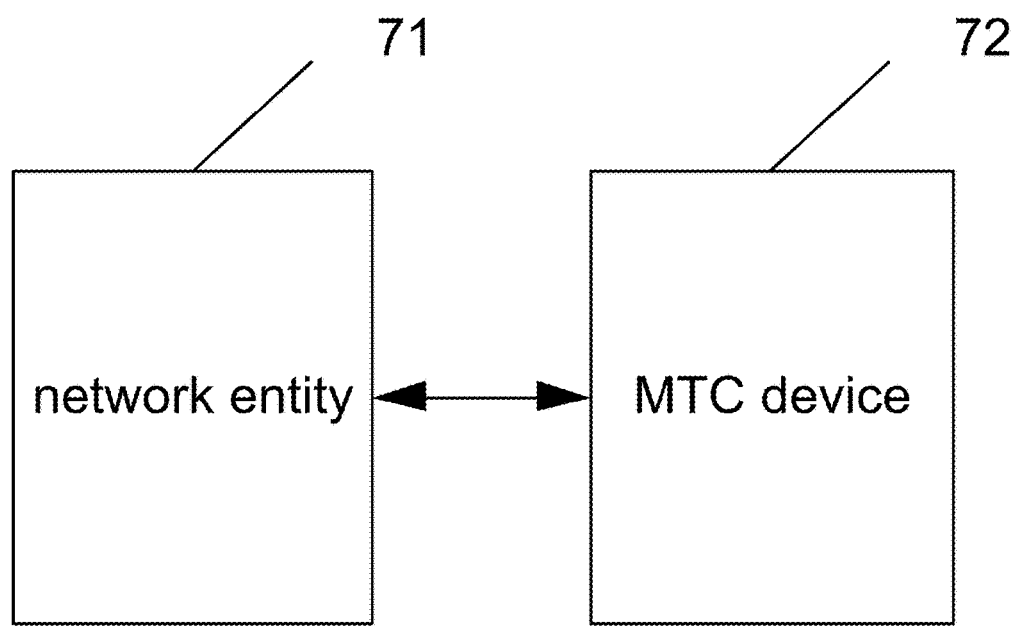
FIG. 7 is a schematic structure illustrating a key negotiation system according to Embodiment Four of the disclosure.

In order to implement the method as shown in FIG. 2, the embodiment provides a key negotiation system. As shown in FIG. 7, the system includes a network entity 71 and an MTC device 72.

Herein, the network entity 71 is configured to generate an MTC communication key between an MTC device 72 or an MTC application on the MTC device 72 and a network by utilizing a key distribution algorithm for MTC communication according to a root key for the MTC communication maintained by the network entity. The network entity 71 generates an MTC group key by utilizing a key distribution algorithm for an MTC group communication according to the root and issues the generated MTC communication key and MTC group key to the MTC device 72 via a secure method.

The MTC device 72 is configured to securely store the MTC communication key and the MTC group key after receiving the MTC communication key and the MTC group key.

Herein, it should be noted that the MTC communication key and the MTC group key may be generated for the MTC device 72, or for the MTC application of the MTC device 72.

Herein, the network entity 71 may be any communication entity for managing the MTC group in the core network, such as MME, SGSN, HSS, MTC-IWF or an MTC service management platform and so on.

The network entity 71 is further configured to create an MTC group and generate a corresponding MTC group identification before generating the MTC communication key and the MTC group key. Accordingly, the MTC device or MTC application may be added into the process of creating the MTC group to complete the key negotiation process.

Based on this, the MTC device 72 is further configured to send MTC group register request information to the network entity 71.

The network entity 71 is further configured to validate or certificate the MTC device 72 after receiving the MTC group register request information, and after passing the validation or certification, update and store a relationship table of the MTC group identification and identity information of the MTC device or MTC application according to the received MTC group register request information.

Herein, the MTC group register request information may include identity information of the MTC device or MTC application and information of the MTC group, etc.

The MTC communication key is used for securing a communication based on a single MTC device/MTC application, and the MTC group key is used for securing a communication based on an MTC group.

The operation of generating an MTC communication key between an MTC device or MTC application and a network by utilizing a key distribution algorithm for MTC communication according to a root key for the MTC communication maintained by the network entity specifically includes: the network entity 71 takes the root key, the identity information of the MTC device 72 or the MTC application and one random number as distribution parameters, and puts the distribution parameters into a key distribution algorithm for the MTC communication to generate the MTC communication key.

Herein, the identity information of the MTC device may be IMEI or IMSI and so on.

The operation of generating an MTC group key by utilizing a key distribution algorithm for MTC group communication according to the root key specifically includes: the network entity 71 takes the root key and one random number as distribution parameters, and puts the distribution parameters into a key distribution algorithm for MTC group communication to generate the MTC group key.

The network entity 71 is further configured to issue an MTC group notification to the MTC device 72 before issuing the generated MTC communication key and the MTC group key to the MTC device 72, and receive acknowledgement information returned by the MTC device.

The MTC device 72 is further configured to perform authentication on the received MTC group notification, and return acknowledgement information to the network entity 71 after passing the authentication.

The MTC device 72 is further configured to store the MTC group identification, and return acknowledgement information to the network entity 71 after storing the MTC communication key, the MTC group key and the MTC group identification.

The network entity 71 is further configured to update MTC communication keys and/or MTC group keys corresponding to all MTC devices or MTC applications in the MTC group of the network entity according to a set security policy.

Specifically, the network entity 71 is configured to issue a key update notification to the MTC device 72, and issue the MTC group identification and a new MTC communication key and/or MTC group key corresponding to the MTC group identification to the MTC device 72 via a secure method after receiving the acknowledgement information returned by the MTC device.

The MTC device 72 is configured to perform authentication on the received key update notification of the MTC group after receiving the key update notification issued by the network entity 71, return acknowledgement information to the network entity 71 after passing the authentication, and update with and securely store a new MTC communication key and/or MTC group key corresponding to the MTC group identification after receiving the MTC group identification and the new MTC communication key and/or new MTC group key.

Herein, the notification information may include MTC group identification information.

The MTC device 72 is further configured to return acknowledgement information to the network entity 71 after storing the new MTC communication key and/or MTC group key.

The network entity 71 is further configured to receive acknowledgement information for the key update returned by the MTC device.

According to the solution provided by the embodiment, the network entity generates an MTC communication key between an MTC device or MTC application and a network by utilizing a key distribution algorithm for an MTC communication according to a root key for the MTC communication maintained by the network entity, generates an MTC group key by utilizing a key distribution algorithm for MTC group communication according to the root key, and issues the generated MTC communication key and the MTC group key to the MTC device or MTC application via a secure method, so as to allow the MTC device or MTC application to securely store the MTC communication key and the MTC group key. Therefore, two types of session keys are simultaneously obtained through one key negotiation process, thereby effectively reducing signaling load of the MTC communication system.

In addition, the network entity manages and maintains a root key for the MTC communication. Meanwhile, the network entity further deploys a key distribution algorithm for the MTC communication and a key distribution algorithm for the MTC group communication. Herein, the key distribution algorithm for the MTC communication is used for generating the MTC communication key between the MTC device and the network, and the key distribution algorithm for the MTC group communication is used for generating the MTC group key. Since the root key acts as a seed key of the key distribution algorithms for the MTC communication key and the MTC group key, thus the network entity is only required to maintain and manage the root key, the key distribution algorithm for the MTC communication and the key distribution algorithm for the MTC group communication, without maintaining and managing all communication keys and group keys, thereby effectively reducing resource consumption of the network entity.

Those skilled in the art shall understand that the embodiments of the disclosure may be provided as a method, a system or a computer program product. Thus, forms of hardware embodiments, software embodiments or embodiments integrating software and hardware may be adopted in the disclosure. Moreover, a form of the computer program product implemented on one or more computer available storage media (including, but are not limited to, a disk memory, an optical memory and the like) containing computer available program codes may be adopted in the disclosure.

The disclosure is described with reference to flow charts and/or block diagrams of the method, the device (system) and the computer program product according to the embodiments of the disclosure. It will be appreciated that each flow and/or block in the flow charts and/or the block diagrams and a combination of the flows and/or the blocks in the flow charts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flow charts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, such that a manufactured product including an instruction apparatus is generated via the instructions stored in the computer readable memory, and the instruction apparatus implements the functions designated in one or more flows of the flow charts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flow charts and/or one or more blocks of the block diagrams.

Correspondingly, the embodiment of the disclosure also provides a computer storage medium. The computer storage medium includes a set of instructions. When the instructions are executed, at least one processor is triggered to execute the key negotiation method of the embodiment of the disclosure.

The above is only the preferred embodiments of the disclosure and not intended to limit the scope of protection of the disclosure

The invention claimed is:

1. A key negotiation method applied to a network entity, comprising:
    generating a Machine Type Communication (MTC) communication key between an MTC device or MTC application and a network by utilizing a key distribution algorithm for MTC communication according to a root key for the MTC communication maintained by the network entity; generating an MTC group key by utilizing a key distribution algorithm for MTC group communication according to the root key;
    issuing the generated MTC communication key and the generated MTC group key to the MTC device or MTC application via a secure method so as to allow the MTC device or MTC application to securely store the MTC communication key and the MTC group key;
    issuing a key update notification to all the MTC devices or MTC applications;
    receiving acknowledgement formation returned by the MTC devices or MTC applications; and
    issuing a MTC group identification and a new MTC communication key and/or MTC group key corresponding to the MTC group identification to a corresponding MTC device or MTC application via a secure method so as to allow the corresponding MTC device or MTC application to update with and securely store the new MTC communication key and/or MTC group key corresponding to the MTC group identification.

2. The method according to claim 1, before generating the MTC communication key and the MTC group key, the method further comprising:
    creating an MTC group and generating the MTC group identification;
    receiving MTC group register request information sent by the MTC device or MTC application; and
    validating or certificating the MTC device or MTC application, and after passing the validation or certification, updating and storing a relationship table of the MTC group identification and identity information of the MTC device or MTC application according to related information in the received MTC group register request information.

3. The method according to claim 2, before issuing the generated MTC communication key and the MTC group key to the MTC device or MTC application via the secure method, the method further comprising:
    issuing an MTC group notification to the MTC device or MTC application; and
    receiving acknowledgement information returned by the MTC device or MTC application.

4. The method according to claim 3, after issuing the MTC communication key and the MTC group key, the method further comprising:
    receiving acknowledgement information returned by the MTC device or MTC application.

5. The method according to claim 1, wherein generating the MTC communication key between the MTC device or MTC application and the network by utilizing the key distribution algorithm for the MTC communication according to the root key for the MTC communication maintained by the network entity comprises:
    taking the root key, the identity information of the MTC device or MTC application and one random number as distribution parameters, and putting the distribution parameters into the key distribution algorithm for the MTC communication to generate the MTC communication key.

6. The method according to claim 1, wherein generating the MTC group key by utilizing the key distribution algorithm for the MTC group communication according to the root key comprises:
    taking the root key and one random number as distribution parameters, and putting the distribution parameters into the key distribution algorithm for the MTC group communication to generate the MTC group key.

7. A network entity, comprising: a processor, a transmitter and a receiver, wherein
    the processor is configured to:
    generate a Machine Type Communication (MTC) communication key between an MTC device or MTC application and a network by utilizing a key distribution algorithm for MTC communication according to a maintained root key for the MTC communication; and
    generate an MTC group key by utilizing a key distribution algorithm for MTC group communication according to the root key; and
    the transmitter is configured to issue the generated MTC communication key and the generated MTC group key to the MTC device or MTC application via a secure method so as to allow the MTC device or MTC application to securely store the MTC communication key and the MTC group key;
    wherein the receiver is configured to receive the acknowledgement information returned by the MTC device or MTC application after securely storing the MTC communication key and the MTC group key by the MTC device or MTC application; and
    the transmitter is further configured to issue a key update notification to all MTC devices or MTC applications, and issue a MTC group identification and a new MTC communication key and/or MTC group key corresponding to the MTC group identification to a corresponding MTC device or MTC application via a secure method so as to allow the corresponding MTC device or MTC application to update with and securely store the new MTC communication key and/or MTC group key corresponding to the MTC group identification.

8. The network entity according to claim 7, wherein the processor is further configured to create an MTC group, generate the MTC group identification, validate or certificate the MTC device or MTC application, after passing the validation and or certification, update and store a relationship table of the MTC group identification and identity information of the MTC device or MTC application according to related information in a received MTC group register request information;

the receiver is further configured to receive MTC group register request information sent by the MTC device or MTC application.

9. The network entity according to claim 8, wherein the transmitter is further configured to issue an MTC group notification to the MTC device or MTC application, and issue the generated MTC communication key and the generated MTC group key to the MTC device or MTC application via a secure method in response to trigger from the receiver; and the receiver is further configured to trigger the transmitter after receiving acknowledge information returned by the MTC device or MTC application.

10. A non-transitory computer storage medium, comprising a set of instructions, which, when being executed, cause at least one processor to execute a key negotiation method applied to a network entity, wherein the method comprising:

generating a Machine Type Communication (MTC) communication key between an MTC device or MTC application and a network by utilizing a key distribution algorithm for MTC communication according to a root key for the MTC communication maintained by the network entity; generating an MTC group key by utilizing a key distribution algorithm for MTC group communication according to the root key; and issuing the generated MTC communication key and the generated MTC group key to the MTC device or MTC application via a secure method so as to allow the MTC device or MTC application to securely store the MTC communication key and the MTC group key;

issuing a key update notification to all the MTC devices or MTC applications;

receiving acknowledgement formation returned by the MTC devices or MTC applications; and issuing a MTC group identification and a new MTC communication key and/or MTC group key corresponding to the MTC group identification to a corresponding MTC device or MTC application via a secure method so as to allow the corresponding MTC device or MTC application to update with and securely store the new MTC communication key and/or MTC group key corresponding to the MTC group identification.

* * * * *